US012671007B2

(12) United States Patent
Petek et al.

(10) Patent No.: US 12,671,007 B2
(45) Date of Patent: Jun. 30, 2026

(54) SYSTEMS AND METHODS FOR ASSEMBLING ELECTRON SPIN AND CHARGE TO POSSESS PROPERTIES OF A MAGNETIC MONOPOLE

(71) Applicants: University of Pittsburgh—Of the Commonwealth System of Higher Education, Pittsburgh, PA (US); THE TRUSTEES OF COLUMBIA UNIVERSITY IN THE CITY OF NEW YORK, New York, NY (US)

(72) Inventors: Hrvoje Petek, Pittsburgh, PA (US); Yanan Dai, New York, NY (US); Chen-Bin Huang, Hsinchu (TW); Atreyie Ghosh, Pittsburgh, PA (US); Zhikang Zhou, Pittsburgh, PA (US)

(73) Assignees: University of Pittsburgh—Of the Commonwealth System of Higher Education, Pittsburgh, PA (US); The Trustees of Columbia University in the City of New York, New York, NY (US)

( * ) Notice: Subject to any disclaimer, the term of this patent is extended or adjusted under 35 U.S.C. 154(b) by 428 days.

(21) Appl. No.: 18/556,743

(22) PCT Filed: Apr. 22, 2022

(86) PCT No.: PCT/US2022/025894

§ 371 (c)(1),
(2) Date: Oct. 23, 2023

(87) PCT Pub. No.: WO2022/226274

PCT Pub. Date: Oct. 27, 2022

(65) Prior Publication Data

US 2024/0371540 A1 Nov. 7, 2024

Related U.S. Application Data

(60) Provisional application No. 63/179,085, filed on Apr. 23, 2021.

(51) Int. Cl.
*G21K 1/20* (2026.01)
*G21K 1/06* (2006.01)

(52) U.S. Cl.
CPC ................. *G21K 1/20* (2026.01); *G21K 1/06* (2013.01); *G21K 1/065* (2013.01)

(58) Field of Classification Search
CPC G21K 1/20; G21K 1/06; G21K 1/065; G06N 10/40
See application file for complete search history.

(56) References Cited

U.S. PATENT DOCUMENTS 4,674,091 A * 6/1987 Colson .................. H01S 3/0903 372/20
6,389,053 B1 * 5/2002 Tomaru ............... H01S 3/09415 372/98

(Continued)

FOREIGN PATENT DOCUMENTS

CN 109848565 A 6/2019
DE 10344915 A1 * 4/2005 ............. B82Y 30/00

(Continued)

OTHER PUBLICATIONS

Bliokh et al. (2015) "Spin-orbit interactions of light," Nature Photonics 9(12):796-808.

(Continued)

*Primary Examiner* — David A Vanore
(74) *Attorney, Agent, or Firm* — Goodwin Procter LLP

(57) ABSTRACT

Described herein are systems and methods for assembling electron spin and charge to possess one or more properties of a magnetic monopole. Example systems can include a (Continued)

Light orbital angular momentum laser configured to generate a light beam with a first spin and/or a first orbital angular momentum, and a surface including a coupling structure having a geometrical charge. When exposed to the light beam, the surface is configured to enable excitations of surface plasmon polariton field waves at metal-dielectric interfaces of the coupling structure to generate a plasmonic field. The surface can be configured to focus the plasmonic field to form a plasmonic vortex, in which plasmonic spin-orbit coupling between a total spin and a total orbital angular momentum forms a topological spin texture that is homotopic to that of a magnetic monopole.

24 Claims, 7 Drawing Sheets

(56) References Cited

U.S. PATENT DOCUMENTS

| | | | | |
|---|---|---|---|---|
| 6,404,536 | B1 * | 6/2002 | Lean | G02B 27/283 359/489.09 |
| 6,476,383 | B1 * | 11/2002 | Esslinger | H05H 3/02 250/251 |
| 9,622,335 | B2 * | 4/2017 | Gall | A61N 5/1077 |
| 9,705,561 | B2 * | 7/2017 | Henry | H02J 13/1323 |
| 9,749,053 | B2 * | 8/2017 | Henry | H02J 13/1323 |
| 9,793,954 | B2 * | 10/2017 | Bennett | H04B 3/56 |
| 9,865,911 | B2 * | 1/2018 | Henry | H01P 5/087 |
| 9,866,309 | B2 * | 1/2018 | Bennett | H04B 7/15507 |
| 9,882,257 | B2 * | 1/2018 | Henry | H04B 3/52 |
| 9,912,027 | B2 * | 3/2018 | Henry | H01P 1/30 |
| 9,917,341 | B2 * | 3/2018 | Henry | H01P 5/107 |
| 10,069,535 | B2 * | 9/2018 | Vannucci | H01P 3/10 |
| 10,103,422 | B2 * | 10/2018 | Britz | H01Q 1/1228 |
| 10,225,025 | B2 * | 3/2019 | Henry | H04B 17/0085 |
| 10,657,456 | B1 * | 5/2020 | Kharzeev | G06N 10/40 |
| 2002/0141034 | A1 * | 10/2002 | Hu | G02B 5/3083 359/281 |
| 2003/0129545 | A1 | 7/2003 | Kik et al. | |
| 2004/0100997 | A1 * | 5/2004 | Tejada | H01S 1/02 372/1 |
| 2008/0067940 | A1 * | 3/2008 | Gorrell | G02B 6/1226 315/39 |
| 2009/0214885 | A1 | 8/2009 | Her et al. | |
| 2019/0006343 | A1 | 1/2019 | Chen et al. | |
| 2019/0212147 | A1 * | 7/2019 | Moxley, III | H01S 5/10 |
| 2019/0377213 | A1 | 12/2019 | Wei et al. | |
| 2020/0250567 | A1 * | 8/2020 | Yu | G06N 10/40 |
| 2020/0371026 | A1 | 11/2020 | Dutta et al. | |
| 2021/0133614 | A1 * | 5/2021 | Ashrafi | G02F 3/00 |
| 2024/0353758 | A1 * | 10/2024 | Petek | G03F 7/70091 |
| 2024/0371540 | A1 * | 11/2024 | Petek | G06N 10/40 |
| 2025/0355315 | A1 * | 11/2025 | Choi | G02F 1/3503 |

FOREIGN PATENT DOCUMENTS

| | | | | |
|---|---|---|---|---|
| JP | 2012525603 A | * | 10/2012 | B82Y 20/00 |
| JP | 6139893 B2 | * | 5/2017 | B82Y 30/00 |
| WO | WO-2022226274 A1 | * | 10/2022 | G21K 1/20 |

OTHER PUBLICATIONS

Bliokh et al. (2017) "Theory and applications of free-electron vortex states," Physics Reports 690:1-70.

Grillo et al. (2017) "Observation of nanoscale magnetic fields using twisted electron beams," Nature Communications 8(1):1-6.

International Search Report and Written Opinion for PCT/US2022/025894 mailed Aug. 16, 2022 (9 pages).

Padgett et al. (2004) "Light's orbital angular momentum," Physics Today 57(5):35-40.

Skvortsov et al. (2002) "The Magnetic Monopoles generation in laserinduced discharges," 29 EPS Conference on Plasma Phys. 26B (4 pages).

Vanacore et al. (2019) "Ultrafast Generation and Control of an Electron Vortex Beam via Chiral Plasmonic Near Fields," Nature Materials 18(6):573-9.

Xiao et al. (2017) "Spin-dependent optics with metasurfaces," Nanophotonics 6(1):215-234.

Dai et al. "Plasmonic topological quasiparticle on the nanometre and femtosecond scales," Nature 588.7839:616-619 (2020).

Dai et al. "The birth of a plasmonic topological quasiparticle on the nanofemto scale," arXiv preprint arXiv:1912.03831 (2019).

Ghosh et al. "A topological lattice of plasmonic merons," Applied Physics Reviews 8.4:041413 (2021).

International Search Report and Written Opinion for PCT/US2022/040875 mailed Dec. 20, 2022 (14 pages).

* cited by examiner

SYSTEMS AND METHODS FOR ASSEMBLING ELECTRON SPIN AND CHARGE TO POSSESS PROPERTIES OF A MAGNETIC MONOPOLE

CROSS-REFERENCE TO RELATED APPLICATIONS

This application is a U.S. national stage application, filed under U.S.C. § 371, of International Application No. PCT/US2022/025894, filed on Apr. 22, 2022, which claims priority to and the benefit of U.S. Provisional Patent Application No. 63/179,085, entitled "SYSTEMS AND METHODS FOR ASSEMBLING ELECTRON SPIN AND CHARGE TO POSSESS PROPERTIES OF A MAGNETIC MONOPOLE," filed on Apr. 23, 2021, the entire contents of each of which are incorporated herein by reference.

GOVERNMENT SUPPORT

This invention was made with government support under grant number CHE-1414466 awarded by the National Science Foundation (NSF). The government has certain rights in the invention.

TECHNICAL FIELD

The following disclosure is directed to methods and systems for generating a magnetic monopole element and, more specifically, methods and systems for assembling electron spin and charge to possess one or more properties of a magnetic monopole.

BACKGROUND

Electricity and magnetism allow the existence of electric and magnetic monopoles. An electron is an electric monopole, but magnetic monopoles are not known to exist as discrete particles. If magnetic monopoles existed, they could be incorporated in new devices based on classical and quantum physics.

SUMMARY

Electron spin and charge may be assembled to possess the properties of a magnetic monopole. In one aspect, the disclosure features a system for assembling electron spin and charge to possess one or more properties of a magnetic monopole. The system can include a laser configured to generate a light beam with a first spin and/or a first orbital angular momentum; and a surface including a coupling structure having a geometrical charge. When exposed to the light beam, the surface is configured to enable excitations of surface plasmon polariton field waves at metal-dielectric interfaces of the coupling structure to generate a plasmonic field. The first spin, the first orbital angular momentum, and the coupling structure define a second orbital angular momentum of the waves and the waves carry a second spin. The surface is further configured to focus the plasmonic field to form a plasmonic vortex, in which plasmonic spin-orbit coupling between a total spin and a total orbital angular momentum forms a topological spin texture that is homotopic to that of a magnetic monopole, and in which the total spin includes the first spin and the second spin and the total orbital angular momentum comprises the first orbital angular momentum and the second orbital angular momentum.

Various embodiments of the system can include one or more of the following features.

A topological charge of the plasmonic field can be based on at least one of: (a) the first spin of the light beam, (b) the first orbital angular momentum of the light beam, or (c) a geometrical charge of the surface. A spin texture of the plasmonic field can be defined by a sign and a magnitude of the topological charge of the plasmonic field. The spin texture of the plasmonic field can have an integer or a half-integer topological charge. The topological spin texture can be a hedgehog texture. The surface can include a plasmonic material. The plasmonic material can be a silver surface, a silver film, polycrystalline film, or specifically-oriented single crystalline silver surface. The coupling structure can include a surface plasmon phase-defining structure. The surface plasmon phase-defining structure can be a metamaterial.

The topological spin texture can be configured to carry and/or process information for quantum computing. The system can be configured to be part of a microscopy system. The system can be configured to be part of a spectroscopy system. The plasmonic vortex can photoemit a propagating electron beam carrying orbital angular momentum. The coupling structure can include at least one nano-lithographically formed structure.

In another aspect, the disclosure features a method for assembling electron spin and charge to possess one or more properties of a magnetic monopole. The method can include generating a light beam with a first spin and/or a first orbital angular momentum; and causing the laser beam to interact with a surface, in which the surface includes a coupling structure having a geometrical charge. The surface can be configured to enable excitations of surface plasmon polariton field waves at metal-dielectric interfaces of the coupling structure to generate a plasmonic field, to which it adds a second orbital angular momentum to waves that also carry spin. The surface can be configured to focus the plasmonic field to form a plasmonic vortex, in which plasmonic spin-orbit coupling between a total spin and a total orbital angular momentum forms a topological spin texture that is homotopic to that of a magnetic monopole, in which the total spin includes the first spin and the second spin and the total orbital angular momentum comprises the first orbital angular momentum and the second orbital angular momentum.

Various embodiments of the method can include one or more of the following features.

A topological charge of the plasmonic field can be based on at least one of: (a) the first spin of the light beam, (b) the first orbital angular momentum of the light beam, or (c) a geometrical charge of the surface. A spin texture of the plasmonic field can be defined by a sign and a magnitude of the topological charge of the plasmonic field. The surface can include a plasmonic material. The plasmonic material can be a silver surface, a silver film, polycrystalline film, or specifically-oriented single crystalline silver surface. The coupling structure can include a surface plasmon phase-defining structure. The surface plasmon phase-defining structure can be a metamaterial. The topological spin texture can be configured to carry and/or process information for quantum computing. The plasmonic vortex can photoemit a propagating electron beam carrying orbital angular momentum. The coupling structure can include at least one nano-lithographically formed structure.

In another aspect, the disclosure features a system for detecting an assembled electron spin and charge possessing one or more properties of a magnetic monopole. The system can include a collector configured to collect a spatial distribution of the assembled electron spin and charge; and an imaging device configured to image an emitted electron spin and charge corresponding to the collected assembled electron spin and charge possessing the one or more properties of the magnetic monopole.

Various embodiments of the system can include one or more of the following features.

The collector can include at least one electromagnetic element configured to direct photoemitted electrons associated with the assembled electron spin and charge onto the imaging device. The at least one electromagnetic element can be configured to amplify the photoemitted electrons. The at least one electromagnetic element can include one or more electromagnetic lenses. A system for assembling the assembled electron spin and charge can include a laser configured to generate a light beam with a first spin and/or a first orbital angular momentum and a surface including nano-lithographically formed structures. When exposed to the light beam, the surface can be configured to enable excitations of surface plasmon polariton field waves at metal-dielectric interfaces of the structures to generate a plasmonic field. The imaging device can further include an aberration correction optical device configured such that the imaging device images with a photoelectron emission having a resolution greater than a diffraction limit of approximately λ/2, where λ is the wavelength of the plasmonic field.

The imaging device can include a multi-channel plate, an intensified phosphor screen, and a camera. A system for assembling the assembled electron spin and charge can include a laser configured to generate a light beam with a first spin and/or a first orbital angular momentum and a surface including nano-lithographically formed structures. When exposed to the light beam, the surface can be configured to enable excitations of surface plasmon polariton field waves at metal-dielectric interfaces of the structures to generate a plasmonic field. The imaging device can be configured to image the collected assembled electron spin and charge over a time period defined by a laser field formed by the laser and/or a decay of the plasmonic field.

In another aspect, the disclosure features a method for detecting an assembled electron charge possessing one or more properties of a magnetic monopole. The method can include collecting, by a collector (e.g., collecting objective lens), a spatial distribution of emitted electron from the assembled electron spin and charge; and imaging, by an imaging device, an emitted electron spin and charge corresponding to the collected assembled electron spin and charge possessing the one or more properties of the magnetic monopole.

Various embodiments of the method can include one or more of the following features.

The method can include directing, by at least one electromagnetic element of the collector, photoemitted electrons associated with the assembled electron spin and charge onto the imaging device. The method can include collecting, by the at least one electromagnetic element, the photoemitted electrons. The at least one electromagnetic element can include one or more electromagnetic lenses.

A system for assembling the assembled electron spin and charge can include a laser configured to generate a light beam with a first spin and/or a first orbital angular momentum; and a surface comprising nano-lithographically formed structures. When exposed to the light beam, the surface can be configured to enable excitations of surface plasmon polariton field waves at metal-dielectric interfaces of the structures to generate a plasmonic field. The imaging device can include an aberration correction optical device configured such that the imaging device images with a photoelectron emission having a resolution greater than a diffraction limit of approximately λ/2, where λ is the wavelength of the plasmonic field.

The imaging device can include a multi-channel plate, an intensified phosphor screen, and a camera. A system for assembling the assembled electron spin and charge can include a laser configured to generate a light beam with a first spin and/or a first orbital angular momentum; and a surface including nano-lithographically formed structures. When exposed to the light beam, configured to enable excitations of surface plasmon polariton field waves at metal-dielectric interfaces of the structures to generate a plasmonic field. The imaging of the collected assembled electron spin and charge is over a time period defined by a laser field formed by the laser and/or a decay of the plasmonic field.

DETAILED DESCRIPTION

Figure 1A:
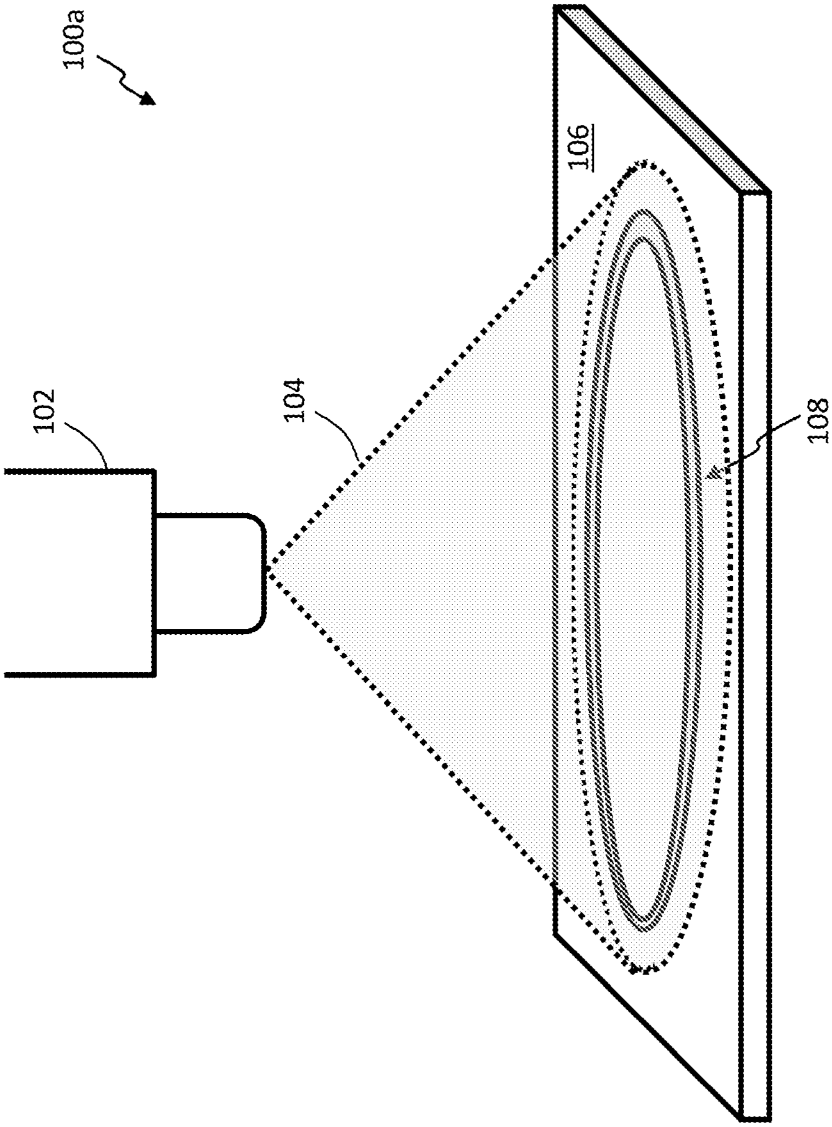
FIGS. 1A-1B are diagrams of example systems for assembling electron spin and charge to possess one or more properties of a magnetic monopole.

Disclosed herein are exemplary embodiments of systems and methods for assembling electron spin and charge to possess one or more properties of a magnetic monopole. The example methods and systems include an optical laser beam with spin and/or orbital angular momentum configured to interact with a surface. The surface can be configured to support surface plasmon polariton excitations at metal/dielectric (e.g., vacuum) interfaces. The surface can include nano-lithographically formed structures that enable the excitations of surface plasmon polariton waves carrying orbital angular momentum, thereby focusing the plasmonic field to form a plasmonic vortex. The topological charge of the plasmonic field can be based on the spin and orbital angular momentum of the light beam and the geometrical charge of the plasmon coupling structure. The topological charge in turn defines the spin texture of the plasmonic field where it comes to a focus (e.g., in a vortex).

In some embodiments, the spin texture of the plasmonic field has an integer topological charge corresponding to Skyrmion-like spin textures. In some embodiments, the spin texture of the plasmonic field has a half-integer topological charge corresponding to meron-like spin textures. The spin textures can exist in the dielectric and the metal, together forming a hedgehog texture on account of the change in sign between the plasmon supporting dielectric and metal media. This hedgehog texture is homotopic to that of a magnetic monopole.

As used herein, the assembled electron spin and charge that possesses one or more properties of a magnetic monopole may be referred to as a "magnetic monopole element". In some embodiments, the properties of the magnetic monopole element can be defined by the quantized angular momentum of the optical beam and the geometric structure of the coupling structure.

The magnetic monopole element breaks the time-reversal symmetry on the time scale of the plasmonic field. The magnetic monopole element can be a source of photoemitted electrons by coherent nonlinear two-photon transmission that carry the spin of electrons and the orbital angular momentum of the plasmonic field. The orbital angular momentum of propagating electrons defines a Laguerre-Gaussian free electron beam with Bessel function distribution that is non-diffracting and self-healing. The nanolithographically formed structure in the metal film can be configured such that it enables the generation of a single plasmonic vortex, plasmonic vortex clusters, and/or vortex arrays. The plasmonic field and spin textures define the coherent electronic interactions in the solid state, in the near-field of the metal/dielectric interface, and/or freely propagating electron beams that are generated by nonlinear photoemission.

The following description provides example systems and methods for assembling electron spin and charge (the "magnetic monopole element") and detection systems and methods for same. Further, the description provides applications for the magnetic monopole element.

Systems and Methods for Assembling Electron Spin and Charge

Figure 1B:
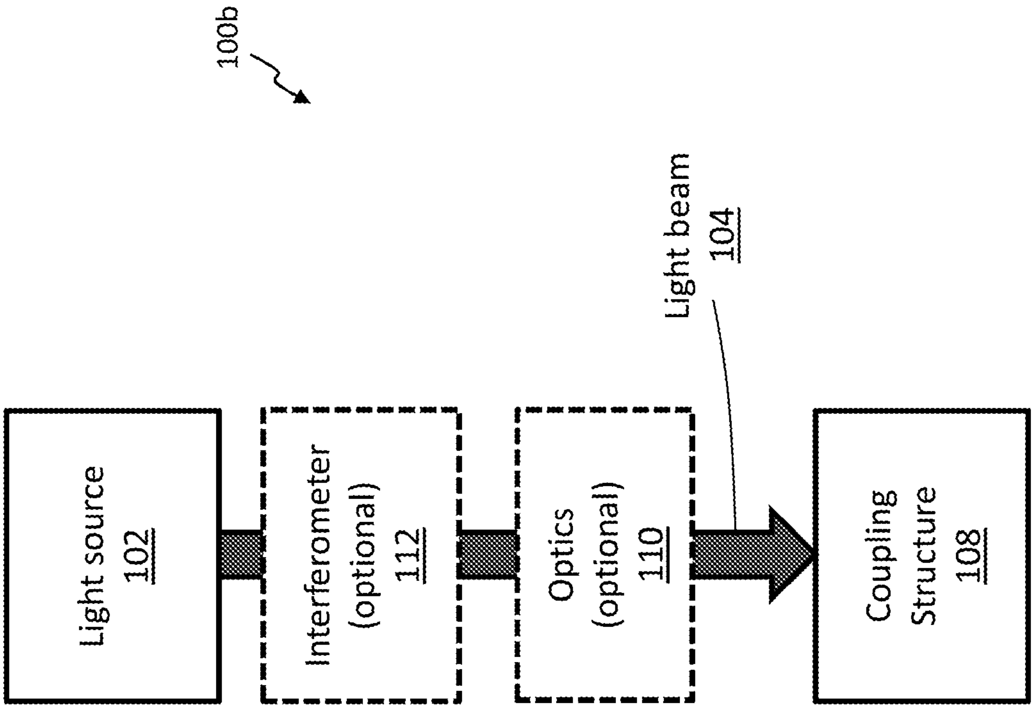
Figure 1C:
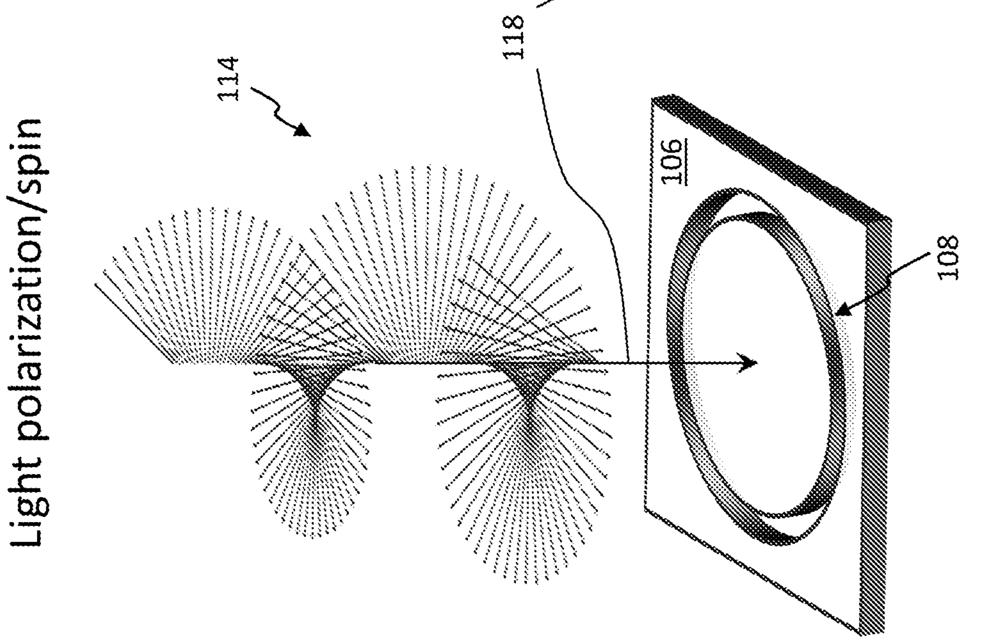
FIGS. 1C-1D are diagrams depicting the polarization and orbital angular momentum of the light beam of FIGS. 1A-1B.
Figure 1D:
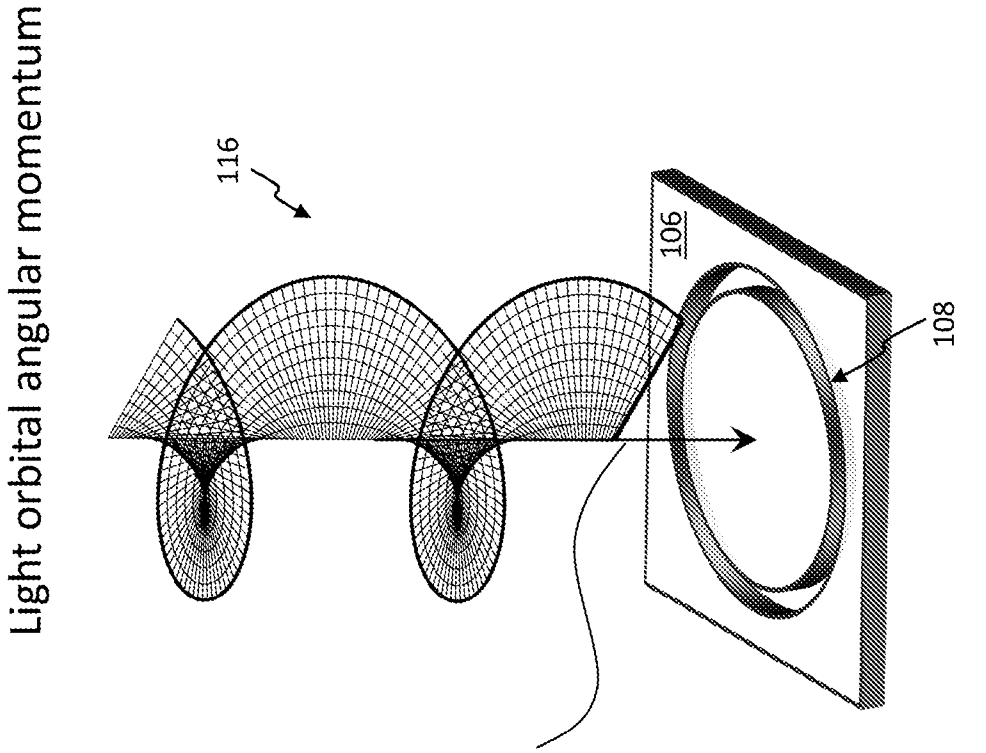
Figure 2:
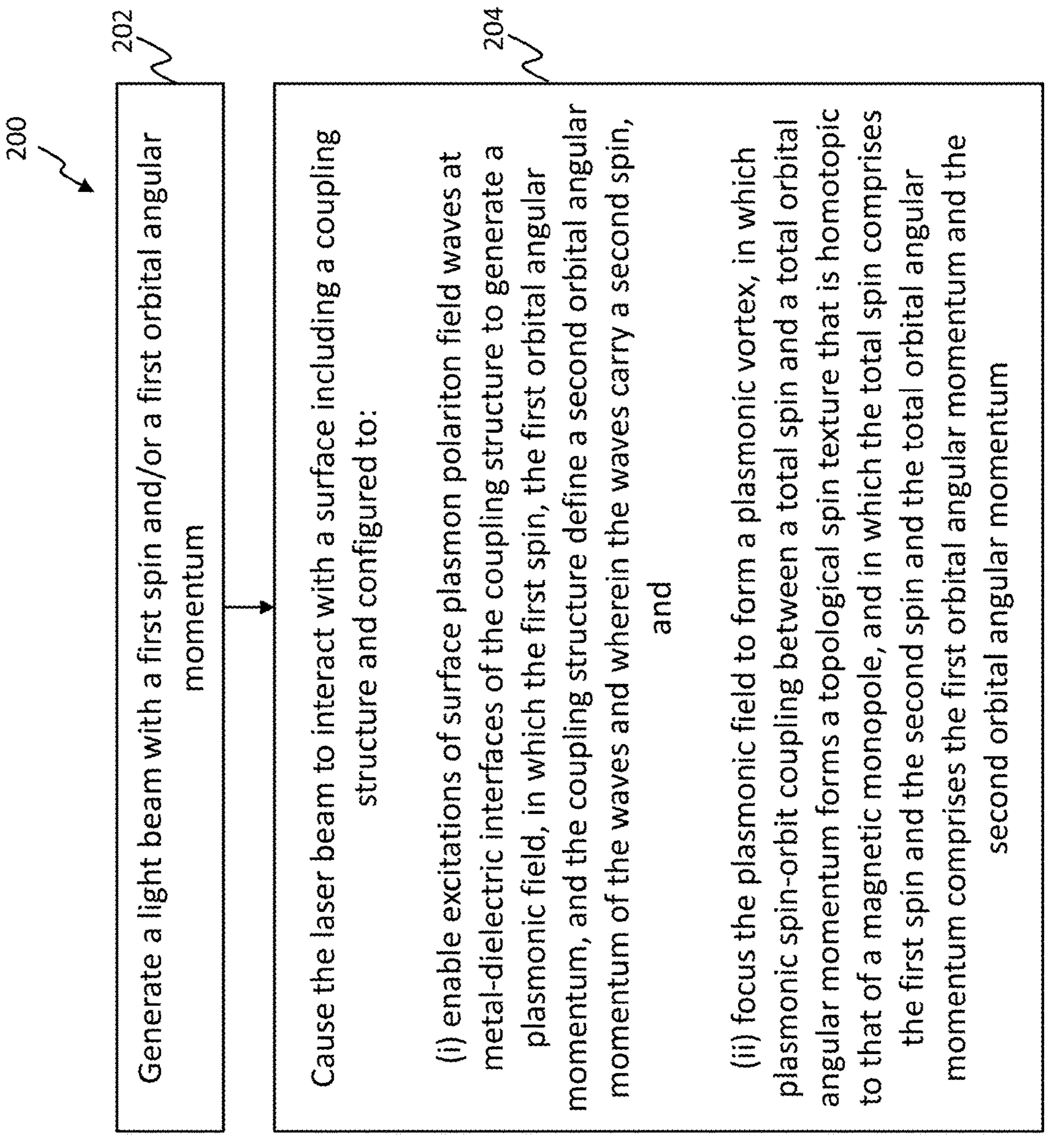
FIG. 2 is a flowchart of an example method for assembling electron spin and charge to possess one or more properties of a magnetic monopole.

FIGS. 1A-1B illustrate example systems 100*a*, 100*b* (collectively referred to as system 100) for assembling electron spin and charge to possess one or more properties of a magnetic monopole (the "magnetic monopole element"). FIGS. 1C-1D illustrate the polarization and orbital angular momentum, respectively, of the light beam of FIGS. 1A-1B. FIG. 2 is a flowchart of a method 200 for assembling electron spin and charge to possess one or more properties of a magnetic monopole.

In particular, FIG. 1A provides a graphical representation of the light interacting with a coupling structure to form the magnetic monopole element. FIG. 1B provides a flowchart representation of the components of the system 100 for assembling electron spin and charge. Referring to FIG. 1A, example system 100*a* includes a light source 102 (e.g., laser) configured to generate a light beam 104 (e.g., laser beam). The light source 102 can be configured to generate a light with variable wavelength (e.g., approximately 550 nm), variable pulse duration (e.g., approximately 20 femtoseconds), and/or variable polarization. The light beam 104 can have a spin and/or an orbital angular momentum. The example light beam 104 can have linear polarization, circular polarization, or elliptical polarization. For example, the light beam 104 can include circularly polarized light (CPL) pulses. The system 100*a* can further include a surface 106 that includes one or more coupling structures (e.g., nanolithographically formed structures) 108. The coupling structure 108 can have a geometrical charge based on the structure's geometry (e.g., dimensions, size, etc.). The geometry can define the spin orbit coupling, which can define the magnetic monopole element, as described further below. One such structure 108 may be a nanofabricated circular coupling structure. As an example, the nanofabricated circular coupling structure can have a slit width and slit depth of approximately 100 nm. FIG. 1C illustrates the polarization 114 (also referred to as the spin) of the light beam 104. FIG. 1D illustrates the orbital angular momentum 116 of the light beam 104. The direction of travel (line 118) of the light beam 104 having polarization 114 and/or orbital angular momentum 116 is approximately orthogonal (e.g., +/−5 degrees of 90 degrees) to the surface of the coupling structure 108.

Note that the laser field may be continuous or pulsed. The laser field may be visible, infrared, or ultraviolet and configured to have a wavelength less than the surface plasmon resonance wavelength for the metal/dielectric surface. In various embodiments, the laser field is coherent and overlaps with the metamaterial coupling structure. The decay length of the plasmonic field can be greater than or equal to one or more dimensions (e.g., radius) of the coupling structure 108. In some embodiments, the surface 106 includes a plasmonic material. For example, the plasmonic material can be a metal surface or a metal film (e.g., a silver surface or a silver film, respectively), where the plasmonic material is positioned atop a silicon substrate. In some embodiments, the surface plasmon polariton (SPP) waves and/or the plasmonic field can be transferred to another material configured to support polariton excitations. For example, the other material can include a two-dimensional transition metal, dichalcogenide, graphene, and/or a quantum material.

Referring to FIG. 2, in step 202 of method 200, the system 100 generates a light beam with a first spin and/or a first orbital angular momentum. When exposed to the light beam 104, in step 204 of method 200, the surface 106 is configured to enable excitations of SPP waves at metal-dielectric interfaces of the structures to generate a plasmonic field. The metal-dielectric interfaces can have a geometrical charge. The SPP waves (also referred to as wave packets or pulses) carry a second spin and/or a second orbital angular momentum. Put another way, the surface can add a second orbital momentum to the SPP waves, which carry the second spin. The SPP waves can propagate radially to come a focus in a plasmonic vortex. In other words, when exposed to the light beam 104, the surface 106 is configured to focus the SPP waves to form the plasmonic vortex. The plasmonic field may have a topological charge that is based on the second spin of the light beam, the second orbital angular momentum, and/or a geometrical charge of the surface. The plasmonic spin-orbit coupling of the plasmon spin and its total orbital angular momentum forms a topological spin texture homotopic to that of a magnetic monopole. In some embodiments, the structures 108 include a surface plasmon phase-defining structure. Note that the phase of the surface plasmon polariton (SPP) waves can be varied by the light's position on the structure 108. The phase-defining structure may be a metamaterial.

The plasmonic spin orbit coupling between the second spin and the second orbital angular momentum can form a topological spin texture that is homotopic to that of a magnetic monopole. Put another way, the vortex photoemits electron beams and the monopole spin texture of the vortex is imparted to these electron beams. In some embodiments, the spin texture of the plasmonic field is based on (e.g., defined by) the sign and the magnitude of the topological charge of the plasmonic field. In some embodiments, the spin texture of the plasmonic field has an integer or half-integer topological charge. In some embodiments, the topological spin texture is a hedgehog texture. Depending on the clockwise or counterclockwise gyration of the vortex, the spin around the vortex converge to or diverge from (respectively) the core, where spin gradually rotates to point down or up (respectively). In some embodiments, the first spin may be related to and/or have the same characteristics of the second spin. In some embodiments, the first orbital angular momentum may be related to and/or have the same characteristics of the second orbital angular momentum.

Referring to FIG. 1B, example system **100*b* can include the light source 102 and coupling structure 108, as described above. In some embodiments, the system 100*b* can further include one or more optical devices 110 (also referred to as an optical system or "optics") such that the light 104 travels through the optics 110 before reaching the coupling structure 108. The optics 110 influence the spin and/or orbital angular momentum of the light 104. Example optics 110 can include one or more phase retarders, a vortex plate, and/or spatial light modulator. For instance, the optics 110 may be passive when a phase retarder is implemented. The optics 110 may be active when a spatial light modulator is implemented. The spatial light modulator can define how the light 104 hits the coupling structure 108, which can be beneficial in quantum computing applications, as described below. For example, the spatial light modulator can vary the light's position on the structure 108**, thereby affecting the phase of the SPP waves.

In some embodiments, the example system **100*b* can include an interferometer 112 positioned between the light source 102 and the coupling structure 108. If optics 110 is part of the system 100*b*, then the interferometer 112 is positioned between the light source 102 and the optics 110. The interferometer 112 can be used to collect information related to the light beam 104 contacting the coupling structure 108**.

Detection Systems and Methods

Figure 3:
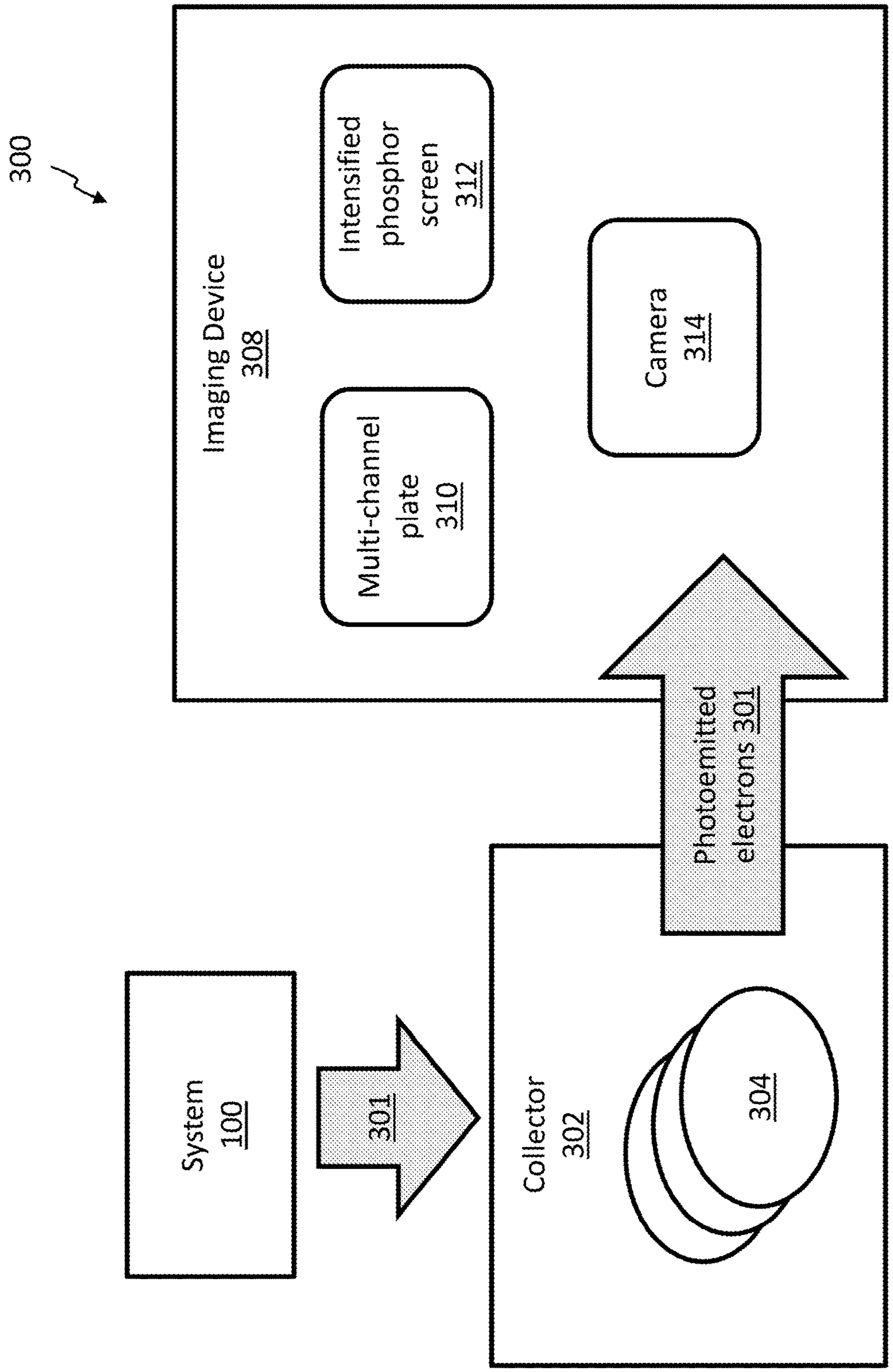
FIG. 3 is a diagram of an example system for detecting an assembled electron spin and charge possessing one or more properties of a magnetic monopole.
Figure 4:
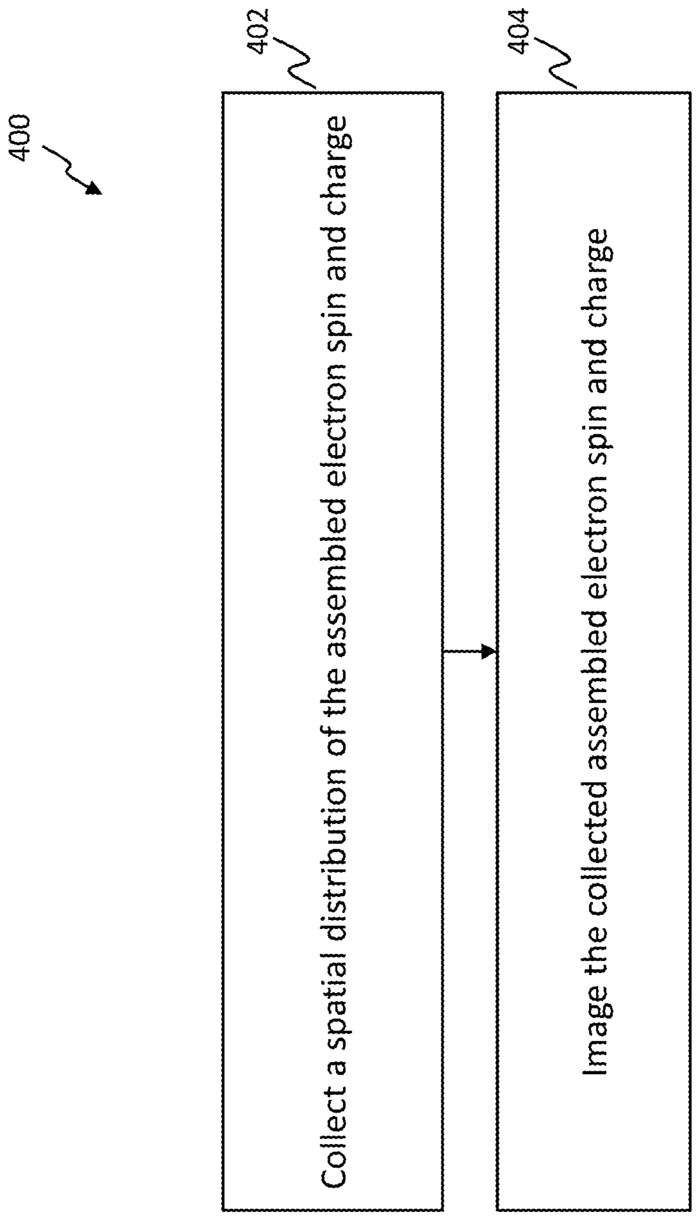
FIG. 4 is a flowchart of an example method for detecting an assembled electron spin and charge possessing one or more properties of a magnetic monopole.

FIG. 3 illustrates a system 300 for detecting an assembled electron spin and charge possessing one or more properties of a magnetic monopole. FIG. 4 illustrates a method 400 for detecting an assembled electron spin and charge possessing one or more properties of a magnetic monopole. For the purposes of clarity and conciseness, FIGS. 3-4 are discussed together herein.

As described in more detail above, example system 100 can produce the assembled electron spin and charge 301. The example detection system 300 includes a collector 302 configured to collect the spatial distribution of the assembled electron spin and charge (step 402 of method 400). The collector 302 can include one or more electromagnetic lenses 304 configured to direct the photoemitted electrons 301 (the assembled electron spin and charge) onto the imaging device 308. An example collector 302 can include up to three (3) lenses, up to five (5) lenses, up to ten (10) lenses, up to fifteen (15) lenses, etc. In some implementations, the collector 302 includes thirteen (13) electromagnetic lenses and two (2) magnetic lenses. In some implementations, the system 300 includes aberration correction optics, which are configured to improve the spatial resolution. Directing the photoemitted electrons 306 may include reflecting and/or refracting the photoemitted electrons 301.

Figure 5:
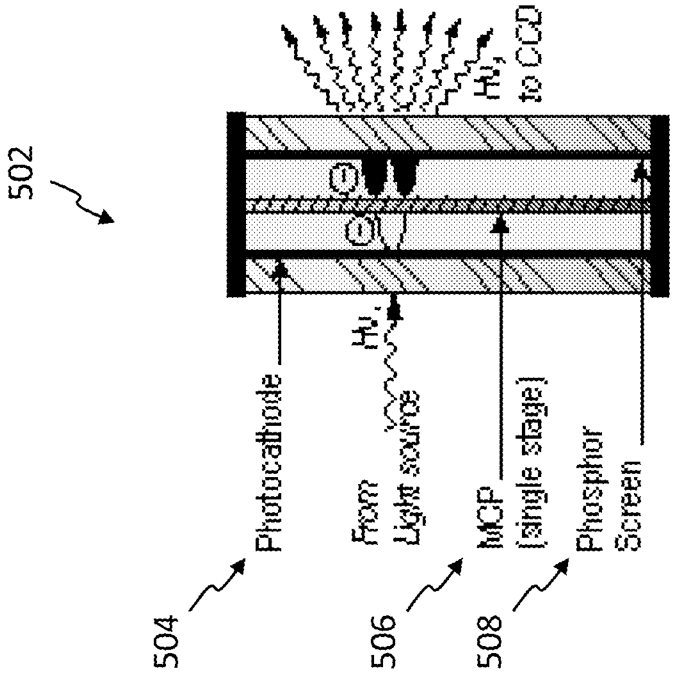
FIG. 5 is a diagram of an example multi-channel plate that can be used in the system of FIG. 3.

The example detection system 300 includes an imaging device 308 configured to image the collected assembled electron spin and charge 301 (step 404 of method 400). In some embodiments, the electromagnetic lenses 304 of the collector 302 are configured to amplify the photoemitted electrons 301. In some embodiments, the imaging device 308 includes a multi-channel plate 310, an intensified phosphor screen 312, and camera 314. FIG. 5 illustrates an example multi-channel plate 502 that can be used in system 300. As shown in FIG. 5, the example multi-channel plate 502 may include a photocathode 504, a micro-channel plate 506 including one or more (e.g., 1, 2, 3, etc.) stages, and a phosphor screen 508. Example multi-channel plate 502 is configured to multiply incoming electrons (from a light source) for detection by camera 314 (e.g., a charge-coupled device (CCD) as shown in FIG. 5). For example, the photoemitted electrons 306 can be imaged by interferometric time resolved photoemission electron microscopy (ITR-PEEM).

In some embodiments, the imaging device 308 is configured to image the collected assembled electron spin and charge over a time period defined by the laser field and/or the plasmonic field decay. In various embodiments, the time period is defined by the pulse width (e.g., approximately 20 femtoseconds) of the laser field. The example imaging device 308 can be configured to integrate over multiple laser pulses at a 1 MHz repetition rate. Because plasmon field has a certain lifetime before it attenuates by transferring energy back to the metal (e.g., of the surface 106), the time period can be limited by the lifetime of the plasmon field. Note that the decay length of the plasmonic field can be greater than or equal to one or more dimensions (e.g., radius) of the coupling structure 108. If the pulse duration is shorter than the plasmonic field lifetime, then the vortex is defined by the lifetime. If the pulse duration is longer than the plasmonic field lifetime, then the system can control the lifetime and the electron beam duration by changing the pulse duration. When the plasmonic field is decaying, the vortex is expected to be present as long as the optical field is delivered.

Applications

The assembly of electron spin and charge to form the magnetic monopole element can be used in a variety of applications. For instance, applications include electron beam imaging of magnetic materials, quantum communication, information processing, and information transfer. Specifically, the magnetic monopole is a permitted but non-existing element of Maxwell's equations of electricity and magnetism. Including a magnetic monopole element in Maxwell's equations affects the determination of how electric fields, magnetic fields, and electron charges interact with matter and, in return, affects the determination of how the monopole element affects the electric fields, magnetic fields and electron charges that interact with matter.

In some embodiments, the spin of the SPP waves is configured to carry and process information for quantum computing. The electron spin can function as a q-bit in quantum computation, where the magnetic monopole spin texture can perform quantum logic gate operations on materials in its near-field. For instance, the generated monopole could encode its spin and topological charge to an electron pulse on 20 fs time scale. This is faster than the 1000 fs or longer scale required for information writing using magnetic counterparts. In another function, the monopole spin textures can generate photoelectron vortex pulses that propagate freely in ultrahigh vacuum with a profile defined by their Bessel function spatial distributions, which make their propagation self-healing and non-diffracting. These properties are attractive for quantum information encoding and transfer. This is because the signal for information transfer may experience obstacles that deteriorate the quality of the signal. Self-healing can be beneficial to reconstruct the pulse to its original quality after being affected by an obstacle, thereby providing protection against degradation by environmental obstacles and/or interfering interactions.

In some embodiments, the system is configured to be part of a microscopy system, e.g., of magnetic materials. The orbital angular momentum can sensitively probe the density and spatial distributions of spin, electric charge, current, magnetic moment, the electric fields and/or magnetic fields to perform analysis of these electromagnetic properties in test materials.

In some embodiments, the system is configured to be part of a spectroscopy system where the spatial distribution, spin, charge, energy, and/or momentum of a scattered electron beam, whose initial properties emerge defined by the magnetic monopole source, are interrogated to obtain information on the electric and magnetic properties of test materials.

Terminology

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A system for assembling electron spin and charge to possess one or more properties of a magnetic monopole, the system comprising:

a laser configured to generate a light beam with a first spin and/or a first orbital angular momentum; and a surface comprising a coupling structure having a geometrical charge, wherein, when exposed to the light beam, the surface is configured to:

(i) enable excitations of surface plasmon polariton field waves at metal-dielectric interfaces of the coupling structure to generate a plasmonic field, wherein the first spin, the first orbital angular momentum, and the coupling structure define a second orbital angular momentum of the waves and wherein the waves carry a second spin, and (ii) focus the plasmonic field to form a plasmonic vortex, wherein plasmonic spin-orbit coupling between a total spin and a total orbital angular momentum forms a topological spin texture that is homotopic to that of a magnetic monopole, wherein the total spin comprises the first spin and the second spin and the total orbital angular momentum comprises the first orbital angular momentum and the second orbital angular momentum.

2. The system of claim 1, wherein a topological charge of the plasmonic field is based on at least one of: (a) the first spin of the light beam, (b) the first orbital angular momentum of the light beam, or (c) the geometrical charge of the surface.

3. The system of claim 2, wherein a spin texture of the plasmonic field is defined by a sign and a magnitude of the topological charge of the plasmonic field.

4. The system of claim 3, wherein the spin texture of the plasmonic field has an integer or half-integer topological charge.

5. The system of claim 3, wherein the topological spin texture is a hedgehog texture.

6. The system of claim 1, wherein the surface comprises a plasmonic material.

7. The system of claim 6, wherein the plasmonic material is a silver surface, a silver film, polycrystalline film, or specifically-oriented single crystalline silver surface.

8. The system of claim 1, wherein the coupling structure comprises a surface plasmon phase-defining structure.

9. The system of claim 8, wherein the surface plasmon phase-defining structure is a metamaterial.

10. The system of claim 1, wherein the topological spin texture is configured to carry and/or process information for quantum computing.

11. The system of claim 1, wherein the system is configured to be part of a microscopy system.

12. The system of claim 1, wherein the system is configured to be part of a spectroscopy system.

13. The system of claim 1, wherein the plasmonic vortex photoemits a propagating electron beam carrying orbital angular momentum.

14. The system of claim 1, wherein the coupling structure comprises at least one nano-lithographically formed structure.

15. A method for assembling electron spin and charge to possess one or more properties of a magnetic monopole, the method comprising:

generating a light beam with a first spin and/or a first orbital angular momentum; and causing the light beam to interact with a surface, the surface comprising a coupling structure having a geometrical charge, and wherein, the surface is configured to:

(i) enable excitations of surface plasmon polariton field waves at metal-dielectric interfaces of the coupling structure to generate a plasmonic field, wherein the first spin, the first orbital angular momentum, and the coupling structure define a second orbital angular momentum of the waves and wherein the waves carry a second spin, and (ii) focus the plasmonic field to form a plasmonic vortex, wherein plasmonic spin-orbit coupling between a total spin and a total orbital angular momentum forms a topological spin texture that is homotopic to that of a magnetic monopole, wherein the total spin comprises the first spin and the second spin and the total orbital angular momentum comprises the first orbital angular momentum and the second orbital angular momentum.

16. The method of claim 15, wherein a topological charge of the plasmonic field is based on at least one of: (a) the first spin of the light beam, (b) the first orbital angular momentum of the light beam, or (c) the geometrical charge of the surface.

17. The method of claim 16, wherein a spin texture of the plasmonic field is defined by a sign and a magnitude of the topological charge of the plasmonic field.

18. The method of claim 15, wherein the surface comprises a plasmonic material.

19. The method of claim 18, wherein the plasmonic material is a silver surface, a silver film, polycrystalline film, or specifically-oriented single crystalline silver surface.

20. The method of claim 15, wherein the coupling structure comprise a surface plasmon phase-defining structure.

21. The method of claim 20, wherein the surface plasmon phase-defining structure is a metamaterial.

22. The method of claim 15, wherein the topological spin texture is configured to carry and/or process information for quantum computing.

23. The method of claim 15, wherein the plasmonic vortex photoemits a propagating electron beam carrying orbital angular momentum.

24. The method of claim 15, wherein the coupling structure comprises at least one nano-lithographically formed structure.

* * * * *